(12) United States Patent
Sankey

(10) Patent No.: US 6,400,291 B1
(45) Date of Patent: Jun. 4, 2002

(54) MULTIPLE TIME DOMAIN SERIAL-TO-PARALLEL CONVERTER

(75) Inventor: Wayne R. Sankey, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/422,126

(22) Filed: Oct. 20, 1999

(51) Int. Cl.$^7$ ................................................. H03M 9/00
(52) U.S. Cl. ....................................... 341/100; 341/101
(58) Field of Search ................................ 341/100, 101;
395/800, 891, 800.16; 364/231.9, 232.8;
375/340, 247

(56) References Cited

U.S. PATENT DOCUMENTS

| | | | | |
|---|---|---|---|---|
| 4,447,804 A | * | 5/1984 | Allen | 340/347 |
| 4,620,180 A | | 10/1986 | Carlton | 340/347 |
| 5,058,141 A | | 10/1991 | Kem et al. | 375/116 |
| 5,152,000 A | * | 9/1992 | Hillis | 395/800 |
| 5,357,249 A | * | 10/1994 | Azaren et al. | 341/100 |
| 5,757,294 A | * | 5/1998 | Fisher et al. | 341/100 |
| 5,799,211 A | * | 8/1998 | Hakkarainen et al. | 395/891 |
| 5,930,311 A | | 7/1999 | Lovelace et al. | 375/354 |
| 6,072,843 A | * | 6/2000 | Baker et al. | 375/340 |

OTHER PUBLICATIONS

PCT International Search Report in International Application No. PCT/US 00/24629, dated Dec. 27, 2000, 7 pages.
EPO Patent Office Patent Abstracts of Japan, English Abstract of JP 59215118, published Dec. 5, 1984, one page.
EPO Patent Office Patent Abstracts of Japan, English Abstract of JP 01180112, published Jul. 18, 1989, one page.
EPO Patent Office Patent Abstracts of Japan, English Abstract of JP 08237141, published Sep. 13, 1996.

* cited by examiner

Primary Examiner—Peguy Jeanpierre
Assistant Examiner—Joseph Lauture
(74) Attorney, Agent, or Firm—Baker Botts L.L.P.

(57) ABSTRACT

A multiple time domain serial-to-parallel converter includes a combiner operable to receive a stream of serial data within a first time domain and to accumulate a portion of the serial data into a set of parallel data. A first hold register is coupled to the combiner. The first hold register is configured to operate within the first time domain and operable to load the set of parallel data in response to a first load signal based on the first time domain. A second hold register is coupled to the first hold register. The second hold register is configured to operate within a second time domain and operable to load the set of parallel data from the first hold register in response to a second load signal based on the second time domain.

26 Claims, 3 Drawing Sheets

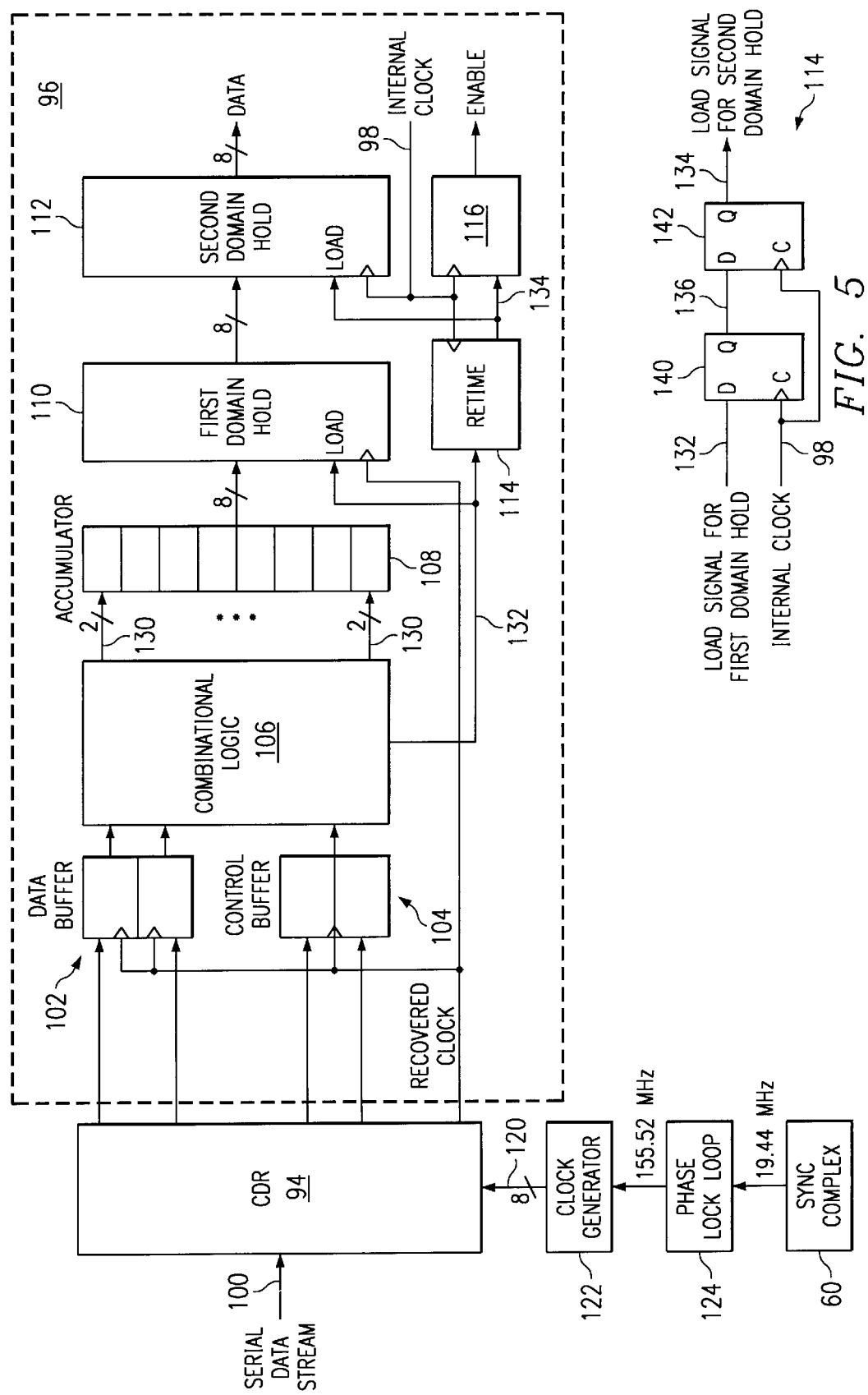

MULTIPLE TIME DOMAIN SERIAL-TO-PARALLEL CONVERTER

TECHNICAL FIELD OF THE INVENTION

This invention relates generally to serial-to-parallel converters, and more particularly to a multiple time domain serial-to-parallel converter for processing traffic within a telecommunications system.

BACKGROUND OF THE INVENTION

Telecommunications systems include customer premise equipment (CPE), local loops connecting each customer premises to a central office or other node, the nodes providing switching and signaling for the system, and internode trunks connecting the various nodes. The customer premise equipment (CPE) includes telephones, modems for communicating data over phone lines, and computer and other devices that can directly communicate video, audio, and other data over a data link. The network nodes include traditional circuit-switched nodes that have transmission paths dedicated to specific users for the duration of a call and employ continuous, fixed-bandwidth transmission and packet-switch nodes that allow dynamic bandwidths, dependent on the application. The transmission media between nodes may be wireline or wireless.

One type of wireline transmission media is optical fiber which is a thin strand of glass that is designed to carry information using pulses of light. Separate optical fibers are bundled together and encased in an outer sheath to form fiber cables. Optical fiber provides users with higher reliability, superior performance, and greater flexibility than traditional copper-based systems.

Optical transmission facilities are installed in the form of synchronous optical network (SONET) rings. SONET defines a line rate hierarchy and frame format as described by the American National Standards Institute (ANSI) T1.105 and T1.106 specifications. Nodes on a SONET ring provide add-drop multiplexing and digital cross-connect functionality for traffic on the ring. SONET rings are typically bi-directional to provide redundant transmission paths and protection in case of a line or node failure.

SONET traffic is serially transmitted around a SONET ring. When received at a node, SONET traffic is converted into parallel data. Thereafter, the parallel data is synchronized to the internal clock of the node for processing. Typically, serial data is converted to parallel data within the transmission time domain. As a result, each stream of parallel data feeds forward the clock signal of the transmission time domain and must be individually synchronized to the local time domain. This is commonly performed with a first-in-first-out (FIFO) circuit which requires the use of memory modules and other resources to synchronize the data from the transmission time domain to the internal time domain of the node.

SUMMARY OF THE INVENTION

The present invention provides a multiple time domain serial-to-parallel converter that substantially eliminates or reduces the problems and disadvantages associated with previous methods and systems. In particular, the multiple time domain serial-to-parallel converter converts serial traffic in a transmission or other first time domain into parallel traffic in an internal or other second time domain.

In accordance with one embodiment of the present invention, a multiple time domain serial-to-parallel converter includes a combiner operable to receive a stream of serial data within a first time domain and to accumulate a portion of the serial data into a set of parallel data. A first hold register is coupled to the combiner. The first hold register is configured to operate within the first time domain and operable to load the set of parallel data in response to a first load signal based on the first time domain. A second hold register is coupled to the first hold register. The second hold register is configured to operate within a second time domain and operable to load the set of parallel data from the first hold register in response to a second load signal based on the second time domain.

More specifically, in accordance with a particular embodiment of the present invention, the first time domain may be a transmission clock recovered with the stream of serial data at a network element. The second time domain may be an internal clock for the network element. In this and other embodiments, the first hold register, the second hold register, and the accumulator may each be implemented in an application specific integrated circuit (ASIC) with a series of flip-flops and multiplexers.

The multiple time domain serial-to-parallel converter may also include a retimer and an enabler. In this embodiment, the retimer is operable to generate the second load signal by retiming the first load signal from the first time domain into the second time domain. This may be accomplished by delaying the first load signal until an active edge of a clock signal for the second time domain. The enabler enables downstream use of the set of parallel data from the second hold register based on a delay of the second load signal. The retimer and enabler may be implemented with flip-flops in the application specific integrated circuit (ASIC).

Technical advantages of the present invention include providing an improved method and system for converting serial traffic to parallel traffic in a network element or other suitable device. In particular, the multiple time domain serial-to-parallel converter simultaneously converts serial traffic received at a network element in a transmission time domain into parallel traffic in an internal time domain of the network element. As a result, incoming data streams are each efficiently synchronized to the internal clock and each feed forward the internal clock. In addition, the method and system utilize a streamlined memory module that requires no random access memory (RAM) and is self-contained. Accordingly, equipment and resource use is reduced within the network element. This allows network elements to be constructed at lower costs and to be operated more efficiently.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 4 is a block diagram illustrating details of a multiple time domain serial-to-parallel converter in the line card of FIG. 3 in accordance with one embodiment of the present invention;

FIG. 5 is a block diagram illustrating details of a retimer in the multiple time domain serial-to-parallel converter of FIG. 4 in accordance with one embodiment of the present invention.

DETAILED DESCRIPTION OF THE INVENTION

Figure 1:
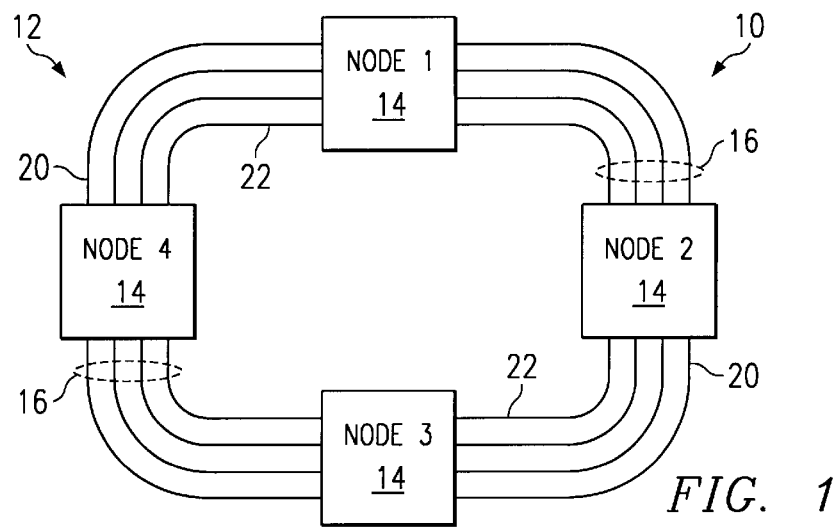
FIG. 1 is a block diagram illustrating a synchronous optical network (SONET) ring of a telecommunications network in accordance with one embodiment of the present invention.

FIG. 1 illustrates a telecommunications system 10 in accordance with one embodiment of the present invention. The telecommunications system 10 transmits voice, video, other suitable types of data, and/or a combination of different types of data between remote locations. In the embodiment of FIG. 1, as described in more detail below, traffic is transmitted in a synchronous optical network (SONET) format. Traffic may be otherwise transmitted in other suitable formats.

Referring to FIG. 1, the telecommunications system 10 includes a SONET ring 12 having a plurality of nodes 14 interconnected by transmission lines 16. The nodes 14 each comprise a network element (NE) capable of communicating traffic in the telecommunications system 10. The network elements comprise switches, routers, add/drop multiplexers, and other devices capable of directing traffic in the telecommunications system 10.

The transmission lines 16 provide a physical interface between the nodes 14. Each physical interface is defined by the bandwidth of the connecting transmission line 16. For the SONET ring 12, the transmission lines 16 each comprise optical fiber capable of transporting traffic between two nodes 14. The optical fiber may be an OC-3 line, an OC-12 line, or the like. For protection switching, redundant transmission lines 20 and 22 are provided to transmit traffic in opposite directions around the SONET ring 12.

On the SONET ring 12, traffic is serially transmitted within SONET frames. The nodes 14 each align received frames for data extraction. Data extracted from a frame is converted to parallel data and synchronized to the internal clock of the node for local processing and/or retransmission.

Figure 2:
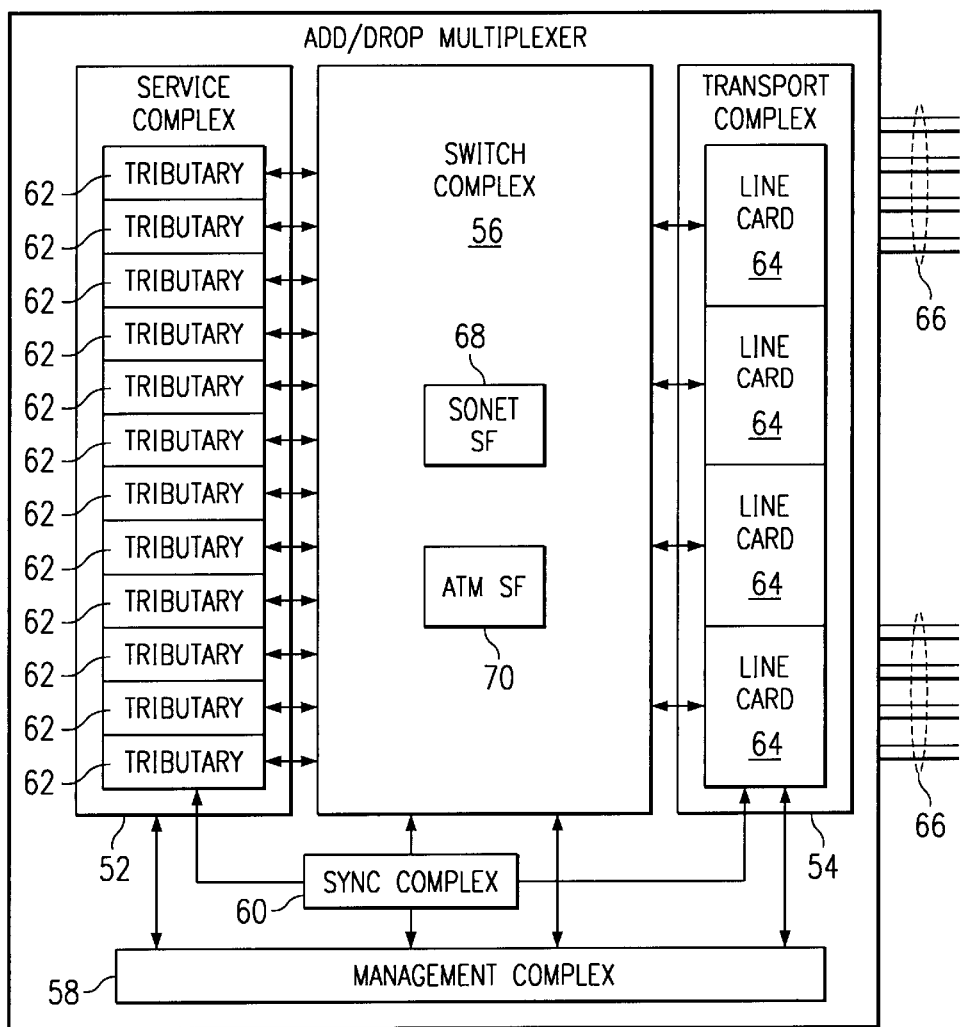
FIG. 2 is a block diagram illustrating details of a network element on the SONET ring of FIG. 1 in accordance with one embodiment of the present invention.

FIG. 2 illustrates details of the nodes 14 in accordance with one embodiment of the present invention. In this embodiment, the nodes 14 are each a multi-protocol add/drop multiplexer 50 capable of handling SONET as well as other types of traffic. The add/drop multiplexer 50 includes a service complex 52, a transport complex 54, a switch complex 56, a management complex 58, and a synchronization complex 60. The disparate complexes 52, 54, 56, 58, and 60 are implemented on or across one or more cards that are interconnected by one or more networks or backplanes within the add/drop multiplexer 50.

Referring to FIG. 2, the service complex 52 includes. a plurality of tributary cards 62. The tributary cards 62 each receive customer input/output (I/O) and perform conversions necessary for processing by the switch complex 56.

The transport complex 54 includes a plurality of line cards 64 for transmitting and receiving data on the transmission lines 66. In a particular embodiment, the line cards 64 are OC-12 line cards that are bi-directional and can handle optical to electrical (O/E) and electrical to optical (E/O) conversions. In this embodiment, the line cards 64 also handle the line and section overhead extraction and insertion, as well as serial-to-parallel conversion and synchronization of incoming data streams. The incoming data streams are received at a line card 64 from the corresponding transmission line 66, direct feeds from the switch complex 56, and direct feeds from other line cards 64.

The switch complex 56 includes a plurality of switch fabrics including a SONET switch fabric 68 and an ATM switch fabric 70. The switch complex 56 may additionally or instead include internet protocol (IP) or other suitable switching fabrics. The switch fabrics each receive traffic on an input port, perform necessary translation, and switch the traffic to an output port using a switch or other suitable device. For example, the ATM switch fabric 70 receives ATM cells on an input port and switches them to an output port using an ATM switch. In switching the ATM cells, the ATM switch fabric 70 first performs necessary translation. The switch complex 56 and/or portions of the switch complex 56 may be implemented on the line cards 64.

The management complex 58 monitors and controls the status of the service, transport, switch, and synchronization complexes 52, 54, 56, and 60. The management complex 58 also maintains alarm, protection switching, and provisioning databases for the add/drop multiplexer 50. The synchronization complex 60 synchronizes the service, transport, and switch complexes 52, 54, and 56 by providing a stable traceable internal reference clock for the add/drop multiplexer 50.

Figure 3:
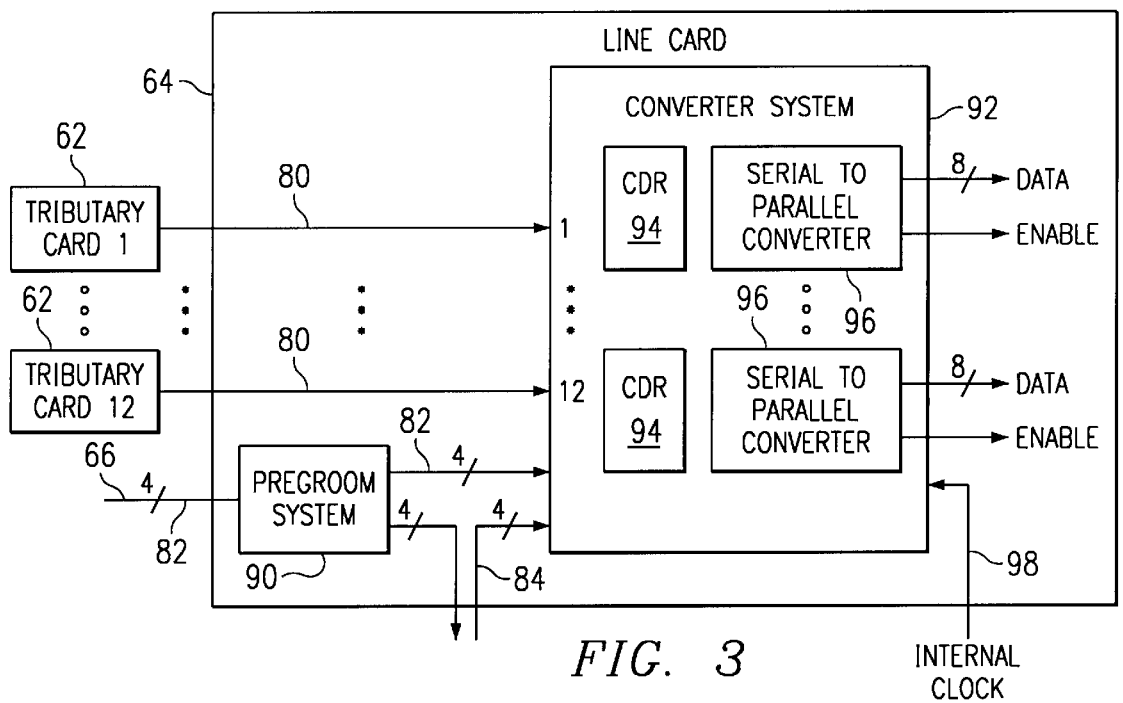
FIG. 3 is a block diagram illustrating details of a line card in the network element of FIG. 2 in accordance with one embodiment of the present invention.

FIG. 3 illustrates details of the line card 64 for the add/drop multiplexer 50 in accordance with one embodiment of the present invention. In this embodiment, the line card 64 receives twenty (20) discrete streams of serial data. In particular, the line card 64 receives a stream of serial data 80 from each of twelve (12) tributary cards 62, four (4) streams of serial data 82 from a corresponding transmission line 66, and four (4) streams of serial data 84 from an adjacent or other line card or cards 64. The streams of serial data 80, 82, and 84 each comprise an OC-3 stream operating at 155 Mbps. The transmission line 66 is an OC-12 line with the four (4) streams of serial data from the transmission line 66 each comprising a portion of the bandwidth of the OC-12 line 66. The line card 64 may receive other or different streams of serial data in other formats and at other rates.

Referring to FIG. 3, the line card 64 includes a pregroom system 90 and a converter system 92. The pregroom system 90 receives serial data streams directly from the corresponding transmission line 66 and grooms each serial stream in accordance with conventional techniques and standards. The groomed serial streams are bridged within the pregroom system 90 for processing in the local line card 64 and/or other line card or cards 64. The bridging function is implemented by a 1:2 multicast or other suitable device capable of transmitting each of the serial streams to a plurality of destinations.

The serial converter 92 includes a clock data recovery (CDR) device 94 and a multiple time domain serial-to-parallel converter 96 for each of the serial data streams 80, 82, and 84. As used herein, the term each means every one of at least a subset of the identified items. As described in more detail below, the clock data recovery device 94 aligns serial bits received in a data stream, recovers the serial bits, and receives the transmission clock from the data stream.

The clock data recovery device 94 may be a conventional device, a bit phase aligner, such as the Texas Instruments DLP52 bit phase aligner, or other suitable aligner or device capable of recovering data and a transmission clock from an input data stream. The clock data recovery device 94 forwards the recovered serial data bits and the transmission clock to the multiple time domain serial-to-parallel converter 96.

The multiple time domain serial-to-parallel converters 96 each convert serial data received from a corresponding clock data recovery device 94, and thus a corresponding serial data stream 80, 82, or 84, to parallel data for processing within the line card 64 and other downstream elements of the add/drop multiplexer 50. In addition, as described in more detail below, the multiple time domain serial-to-parallel converter 96 receives and uses the internal clock 98 generated by the synchronization complex 60 to synchronize the data during the conversion process to the internal time domain of the add/drop multiplexer 50. As a result, the incoming data streams 80, 82, and 84 are each synchronized to the internal clock and each feed forward the internal clock.

In one embodiment, the multiple time domain serial-to-parallel converters 96 are implemented in a streamlined memory module. In this embodiment, the memory module is entirely or substantially implemented by flip-flops and multiplexers in an application-specific integrated circuit (ASIC). This eliminates the need for random access memory (RAM) and other relatively costly resources and improves processing efficiency.

FIG. 4 illustrates details of the multiple time domain serial-to-parallel converter 96 in accordance with one embodiment of the present invention. In this embodiment, SONET traffic in the transmission time domain is converted into successive sets of eight (8) bit wide, or one byte, serial data in the internal clock domain of the add/drop multiplexer 50.

Referring to FIG. 4, the multiple time domain serial-to-parallel converter 96 receives data, control, and the recovered transmission clock from the clock data recovery device 94. The multiple time domain serial-to-parallel converter 96 includes data and control buffers 102 and 104, combinational logic 106, accumulator 108, first time domain hold register 110, second time domain hold register 112, retimer 114, and enabler 116.

The clock data recovery device 94 receives a serial data stream 100 and an alignment clock signal 120. The clock data recovery device 94 uses the alignment clock signal 120 to align the bits in the serial data stream 100 and to recover the bits and the transmission clock from the serial data stream 100. The clock data recovery device 94 outputs the data signal to the data buffer 102 and the recovered clock signal to the first time domain hold register 110 and the retimer, or retime engine, 114. The recovered transmission clock is a copy of the alignment clock 120 at nominally the same frequency as the input serial data stream.

For an OC-3 serial stream 100, the alignment clock 120 comprises a 155.52 MHZ signal. The alignment clock signal 120 is generated by a clock generator 122 based on an input from a phase lock loop 124. The phase lock loop 124 operates based on a 19.44 MHZ signal generated by the synchronization complex 60. The alignment clock may be otherwise suitably generated.

In the embodiment in which data that changes on the falling edge of the clock, a rising edge may be used to achieve the recovered clock output from the clock data recovery device 94 rising in the middle of the data eye. In this embodiment, positive edge triggered flip-flops are used for the elements of the multiple domain serial-to-parallel converter 96 to capture data. Because the data comes out a half period before the clock rising edge, the signals are retimed so that any logic thereafter will have a full period to execute instead of nominally half of a period. In a particular embodiment, each of the accumulator 108, the first time domain hold register 110 and the second time domain hold register 112 include eight positive edge triggered flip-flops with eight 2:1 multiplexers in front to store the eight-bit set of parallel data.

In the multiple time domain serial-to-parallel converter 96, the data buffer 102 is a two-bit register capable of storing up to two bits of data output from the bit phase aligner 94. The control buffer 104 is a two-bit register containing control information indicating to the combinational logic 106 whether it is to take zero, one, or two bits of data from the data buffer 102. In a particular embodiment, the combinational logic 106 takes one bit of data from the data buffer 102 unless otherwise instructed by control information in the control buffer 104. The data and control buffers 102 and 104 are each implemented by flip-flops operated within a first time domain based on the recovered transmission clock signal.

The combinational logic 106 includes a data and a load line 130 for each register within the accumulator 108. The combinational logic 106 retrieves data from the data buffer 102 based on control information in the control buffer 104. After receiving data for a register, the combinational logic 106 generates a load signal for the register. The load signal instructs the register to load the data provided on the data line. In this way, the combinational logic 106 loads data from the serial stream 100 into the accumulator 108 as parallel data. In response to filling the accumulator 108, the combinational logic 106 generates a first time domain load signal 132. The first time domain load signal 132 is used by the first time domain hold register 110 to load data from the accumulator 108 and is retimed by the retime engine 114 to generate a second time domain load signal used by the second time domain hold register 112.

The first time domain hold register 110 is operated within the time domain of the recovered transmission clock and receives the first time domain load signal 132 generated by the combinational logic 106. In response to the first time domain load signal 132, the first time domain hold register 110 loads the parallel data from the accumulator 108. As used herein, the phrase in response to means performing the identified action immediately or on a delayed basis upon receiving at least the identified signal. Accordingly, the identified action may also be based on other intermediate signals. The first time domain load signal 132 is based on the first time domain in that it is generated by the combinational logic 106 operating within the first time domain or otherwise suitably timed into or in accordance with the first time domain.

The retime engine 114 receives the first time domain load signal 132 and the internal clock 98. The retime engine 114 generates a second time domain load signal 134 by retiming the first time domain hold signal 132 into the time domain of the internal clock 98. In one embodiment, the second time domain load signal 134 is the first time domain load signal 132 delayed into the time domain of the internal clock 98. The second time domain load signal 134 is used by the second time domain hold register 112 to load data from the first time domain hold register 110 and is delayed by the enabler 116 to generate an enable signal that allows use of the data in the second time domain hold register 112 by downstream devices.

The second time domain hold register 112 receives the internal clock 98 and is operated within the internal time domain to provide the parallel data in sync with the internal clock of the add/drop multiplexer 50. In particular, the second time domain hold register 112 loads parallel data from the first time domain hold register 110 in response to the second time domain load signal 134 generated by the retime engine 114. The second time domain hold register 112 holds the parallel data for use by downstream devices within the add/drop multiplexer 50.

The enable module 116 receives the second time domain load signal 134 and generates an enable signal allowing the parallel data in the second time domain hold register 112 to be used by downstream devices. In one embodiment, the enable module 116 delays the second time domain load signal 134 by half of the internal clock cycle to ensure that the second domain hold register is completely loaded prior to use of the data. It will be understood that the enable module 116 may otherwise delay or generate an enable signal based upon the second time domain load signal 134 or other suitable signal.

FIG. 5 illustrates details of the retime engine 114 in accordance with one embodiment of the present invention. In this embodiment, the retime engine 114 is implemented in hardware with a pair of flip-flops. It will be understood that the retime engine 114 may be otherwise implemented as any other type of suitable hardware and/or software capable of retiming the first time domain load signal or other suitable signal into the second time domain.

Referring to FIG. 5, the retime engine 114 includes a first flip-flop 140 and a second flip-flop 142. Generally described, the first flip-flop 140 retimes the first time domain load signal 132 into the second time domain while the second flip-flop 142 provides stability to prevent errors in situations in which the data and clock inputs at the first flip-flop 140 change at the same time.

The first flip-flop 140 receives the first time domain load signal 132 at input D and the internal clock 98 at input C. In response to the first time domain load signal 132 at input D, the first flip-flop 140 outputs an intermediate second time domain load signal 136 at output Q upon receipt of the active edge of the internal clock 98 at input C. Accordingly, the intermediate second time domain load signal 136 is the first time domain load signal 132 delayed into the time domain of the internal clock 98.

The second flip-flop 142 receives the intermediate second time domain load signal 136 at input D and the internal clock 98 at input C. In response to receiving the intermediate second time domain load signal 136, the second flip-flop 142 outputs the second time domain load signal 134 upon the active edge of the internal clock 98. As previously described, the second time domain load signal 134 is provided to the second time domain hold register 112 in order to move the parallel data from the transmission clock of the first time domain to the internal clock of the second time domain and is also provided to the enabler 116 in order to enable downstream use of the parallel data from the second time domain hold register 112 in accordance with the internal clock.

Figure 6:
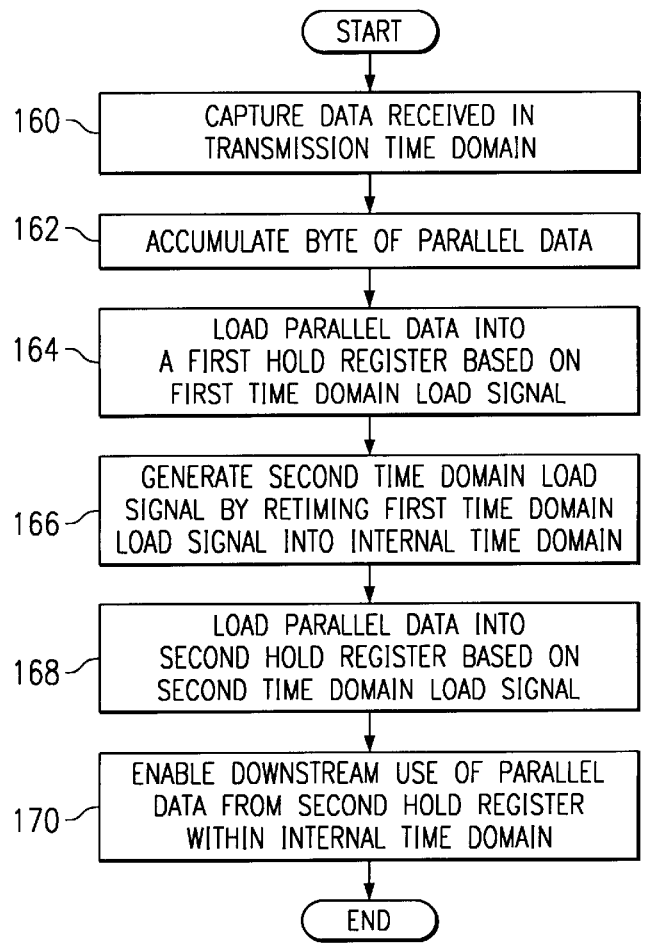
FIG. 6 is a flow diagram illustrating a method for converting serial traffic in a first time domain to parallel traffic in a second time domain in accordance with one embodiment of the present invention.

FIG. 6 is a flow diagram illustrating a method for converting serial traffic in a first time domain to parallel traffic in a second time domain in accordance with one embodiment of the present invention. In this embodiment, serial traffic in a transmission time domain is converted to parallel traffic in an internal time domain of a network element using a series of flip-flops and multiplexers. It will be understood that serial data in another suitable first time domain may be converted to parallel data in another suitable second time domain using the system and method of the present invention.

Referring to FIG. 6, the method begins at step 160 in which serial data received in the transmission time domain is captured. In one embodiment, the serial traffic is captured by receiving SONET traffic at a port, identifying SONET frames carrying the traffic, extracting the serial traffic from the SONET frames, and bit phase aligning the serial traffic.

Proceeding to step 162, a byte of the serial data is accumulated into a set of parallel data. As previously described, the serial data may be accumulated by the combinational logic 106 in the accumulator 108. At step 164, the parallel data is loaded into the first time domain hold register 110 or other suitable data stored in response to a first time domain load signal 132. The first time domain load signal 132 may be generated by the combinational logic 106 upon filling the accumulator 108 and is based on a transmission clock received with the serial data.

Next, at step 166, the retime engine 114 generates the second time domain load signal 134 for shifting the parallel data from the transmission time domain to the internal time domain of the network element. In one embodiment, the second time domain load signal 134 is generated by retiming the first time domain load signal 132 from the transmission clock to the internal clock. At step 168, the parallel data is loaded into the second time domain hold register 112 in response to the second time domain load signal 134.

Proceeding to step 170, downstream use of the parallel data from the second time domain hold register 112 is enabled within the second time domain of the internal clock. In one embodiment, use of the data is enabled based on a delay of the second time domain load signal 134 to ensure the second time domain hold register 112 is fully loaded prior to use of the data. From the second time domain hold register, the data feeds forward the internal clock and needs no further processing for synchronization. In this way, incoming data streams are efficiently synchronized to the internal clock while being converted from serial-to-parallel data for processing.

Although the present invention has been described with several embodiments, various changes and modifications may be suggested to one skilled in the art. It is intended that the present invention encompass such changes and modifications as fall within the scope of the appended claims.

What is claimed is:

1. A multiple time domain serial-to-parallel converter, comprising:
   a combiner operable to receive a stream of serial data within a first time domain and to accumulate a portion of the serial data into a set of parallel data;
   a first hold register coupled to the combiner, the first hold register configured to operate within the first time domain and operable to load the set of parallel data in response to a first load signal based on the first time domain; and
   a second hold register coupled to the first hold register, the second hold register configured to operate within a second time domain and operable to load the set of parallel data from the first hold register in response to a second load signal based on the second time domain.

2. The multiple time domain serial-to-parallel converter of claim 1, wherein the second load signal comprises a delay of the first load signal.

3. The multiple time domain serial-to-parallel converter of claim 1, wherein the first load signal is within the first time domain and the second load signal is within the second time domain, further comprising a retimer operable to receive the first load signal and to generate the second load signal by retiming the first load signal from the first time domain into the second time domain.

4. The multiple time domain serial-to-parallel converter of claim 3, the retimer comprising a plurality of flip-flops operable to retime the first load signal from the first time domain into the second time domain.

5. The multiple time domain serial-to-parallel converter of claim 3, further comprising an application specific integrated circuit (ASIC) configured to implement the combiner, the first hold register, the second hold register, and the retimer.

6. The multiple time domain serial-to-parallel converter of claim 1, wherein the first time domain comprises a transmission clock recovered with the stream of serial data at a network element and the second time domain comprises an internal clock for the network element.

7. The multiple time domain serial-to-parallel converter of claim 1, further comprising an enabler operable to enable downstream use of the set of parallel data from the second hold register within the second time domain.

8. The multiple time domain serial-to-parallel converter of claim 1, further comprising an enabler operable to enable downstream use of the set of parallel data from the second hold register in response to a delay of the second load signal.

9. The multiple time domain serial-to-parallel converter of claim 1, wherein the first time domain comprises a first clock and the second time domain comprises a second clock less than half the speed of the first clock.

10. The multiple time domain serial-to-parallel converter of claim 1, the first hold register comprising a series of flip-flops operable to hold the set of parallel data.

11. The multiple time domain serial-to-parallel converter of claim 1, further comprising:
the first hold register comprising a first series of flip-flops operable to hold the set of parallel data; and
the second hold register comprising a second series of flip-flops operable to hold the set of parallel data.

12. The multiple time domain serial-to-parallel converter of claim 1, further comprising:
the combiner comprising a first series of flip-flops operable to accumulate the set of parallel data;
the first hold register comprising a second series of flip-flops operable to hold the set of parallel data; and
the second hold register comprising a third series of flip-flops operable to hold the set of parallel data.

13. The multiple time domain serial-to-parallel converter of claim 1, further comprising an application specific integrated circuit (ASIC) configured to implement the combiner, the first hold register, and the second hold register.

14. A line card for a network element in the telecommunications system, comprising:
a plurality of links, each link operable to receive a stream of serial data;
a multiple time domain serial-to-parallel converter for each of the links, the multiple time domain serial-toparallel converters each coupled to a corresponding link and comprising:
a combiner operable to receive from the corresponding link the stream of serial data within a first time domain and to accumulate a portion of the serial data into a set of parallel data;
a first hold register coupled to the combiner, the first hold register configured to operate within the first time domain and operable to load the set of parallel data in response to a first load signal based on the first time domain; and
a second hold register coupled to the first hold register, the second hold register configured to operate within a second time domain and operable to load the set of parallel data from the first hold register in response to a second load signal based on the second time domain.

15. The line card of claim 14, wherein the first time domain comprises a transmission clock recovered with the stream of serial data and the second time domain comprises an internal clock for the line card.

16. The line card of claim 14, wherein the second load signal comprises a delay of the first load signal.

17. The line card of claim 14, wherein the first load signal is within the first time domain and the second load signal is within the second time domain, further comprising a retimer operable to receive the first load signal and to generate the second load signal by retiming the first load signal from the first time domain into the second time domain.

18. The line card of claim 17, further comprising an application specific integrated circuit (ASIC) configured to implement the combiner, the first hold register, the second hold register, and the retimer.

19. The line card of claim 14, further comprising an enabler operable to enable downstream use of the set of parallel data from the second hold register in response to a delay of the second load signal.

20. A method for converting serial data in a first time domain to parallel data in a second time domain, comprising:
receiving a stream of serial data within a first time domain;
accumulating a portion of the serial data into a set of parallel data;
loading the set of parallel data into a first hold register in response to a first load signal based on the first time domain; and
loading the parallel data from the first hold register into a second hold register in response to a second load signal based on a second time domain.

21. The method of claim 20, further comprising operating the first hold register within the first time domain and operating the second hold register within the second time domain.

22. The method of claim 20, wherein the second load signal comprises a delay of the first load signal into the second time domain.

23. The method of claim 20, further comprising generating the second load signal by retiming the first load signal from the first time domain into the second time domain.

24. The method of claim 20, further comprising;
recovering a transmission clock as the first time domain from the stream of serial data at network element; and
receiving an internal clock for the network element as the second time domain.

25. The method of claim 20, further comprising enabling downstream use of the set of parallel data from the second hold register based on a delay of the second load signal.

26. The method of claim 20, further comprising generating the second load signal by delaying the first load signal based on a clock for the second time domain.

* * * * *

UNITED STATES PATENT AND TRADEMARK OFFICE
CERTIFICATE OF CORRECTION

PATENT NO. : 6,400,291 B1
DATED : June 4, 2002
INVENTOR(S) : Wayne R. Sankey

It is certified that error appears in the above-identified patent and that said Letters Patent is hereby corrected as shown below:

Column 9,
Line 60, delete "toparallel" and insert -- to-parallel --.

Signed and Sealed this

Twenty-first Day of January, 2003

JAMES E. ROGAN
*Director of the United States Patent and Trademark Office*